(12) United States Patent
Kato

(10) Patent No.: US 9,296,262 B2
(45) Date of Patent: Mar. 29, 2016

(54) PNEUMATIC TIRE WITH SPECIFIED FIRST AND SECOND CARCASS PLIES

(71) Applicant: TOYO TIRE & RUBBER CO., LTD., Osaka-shi, Osaka (JP)

(72) Inventor: Tatsuya Kato, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 274 days.

(21) Appl. No.: 13/827,206

(22) Filed: Mar. 14, 2013

(65) Prior Publication Data

US 2013/0240109 A1    Sep. 19, 2013

(30) Foreign Application Priority Data

Mar. 15, 2012    (JP) .................... 2012-058930

(51) Int. Cl.
*B60C 15/00* (2006.01)
*B60C 9/02* (2006.01)
*B60C 9/06* (2006.01)

(52) U.S. Cl.
CPC .......... *B60C 15/0072* (2013.04); *B60C 9/0207* (2013.04); *B60C 9/06* (2013.01); *B60C 15/0009* (2013.04); *B60C 15/0018* (2013.04); *B60C 15/0045* (2013.04); *B60C 2009/0215* (2013.04); *Y10T 152/10864* (2015.01)

(58) Field of Classification Search
CPC ............. B60C 9/0207; B60C 15/0018; B60C 15/0009; B60C 15/0045; B60C 15/0072; B60C 15/00; B60C 13/00; B60C 2009/0215; B60C 2015/009; Y10T 152/10864
USPC ................................ 152/550–555
See application file for complete search history.

(56) References Cited

U.S. PATENT DOCUMENTS 6,568,446 B1 *    5/2003    Schulte .................... 152/555

FOREIGN PATENT DOCUMENTS

| EP | 1 849 626 A1 | | 10/2007 |
| JP | 02018104 A | * | 1/1990 |
| JP | 2000211317 A | * | 8/2000 |
| JP | 2007-290578 A | | 11/2007 |
| JP | 2008-24063 A | | 2/2008 |
| JP | 2011-958 A | | 1/2011 |

OTHER PUBLICATIONS

English translation of JP 2-18104 A, Jan. 22, 1990.*
Mechanics of Pneumatic Tires, ed. Samuel Clark, US Department of Transportation, Aug. 1981, pp. 216-217.*

* cited by examiner

*Primary Examiner* — Adrienne C Johnstone
(74) *Attorney, Agent, or Firm* — Westerman, Hattori, Daniels & Adrian, LLP

(57) ABSTRACT

A pneumatic tire comprising: first carcass ply that is comprised of; a tire-inner-face part extending along inner face of the tire to span between the tire bead portions; and turned-up parts extended as turned up from outer faces of the tire bead portions up to inside beyond fringes of a belt layer; and second carcass ply that is substantially omitted at between the tire bead portions and extends as being turned up from outer faces of the tire bead portions up to inside beyond fringes of a belt layer; and cords forming the tire-inner-face part, the turned-up part and the second carcass ply having inclination to radial direction of the tire; and direction of the inclination of the cords being alternated in respect of leftward or rightward, between two adjacent ones of the tire-inner-face part, the turned-up part and the second carcass ply.

3 Claims, 2 Drawing Sheets

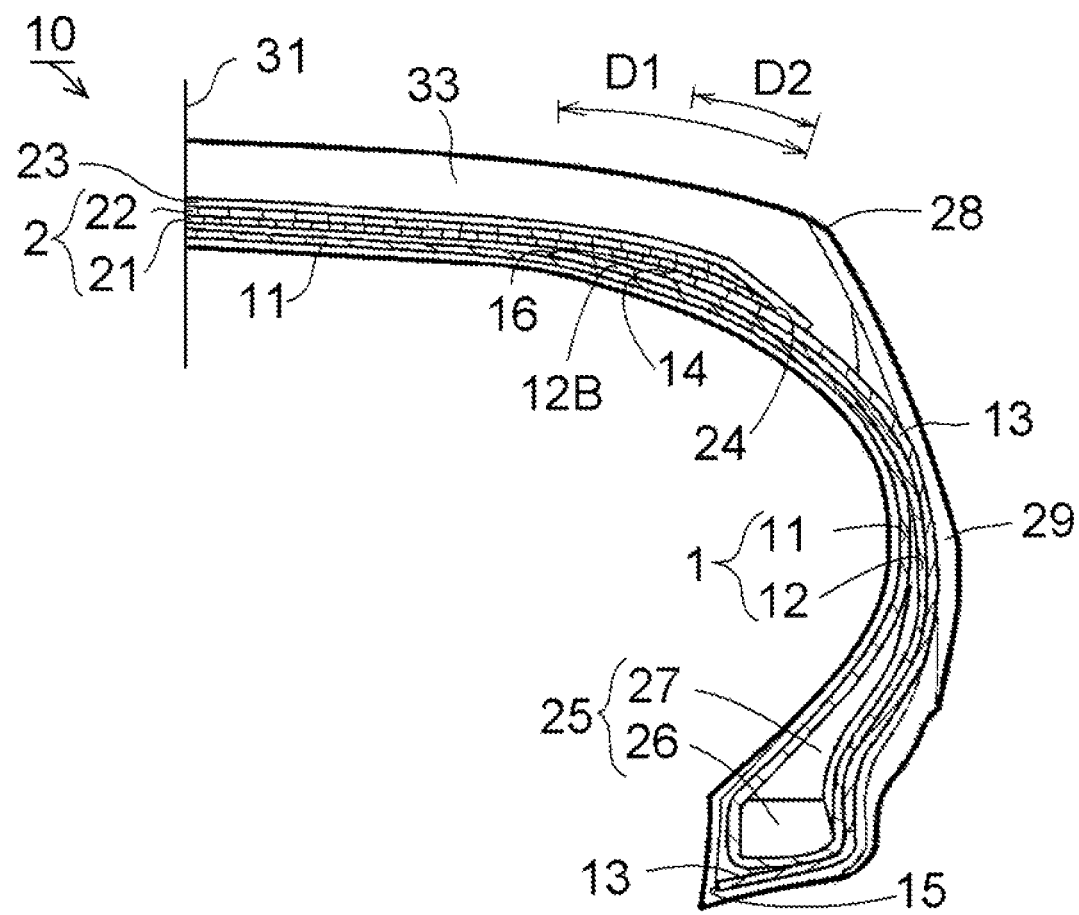

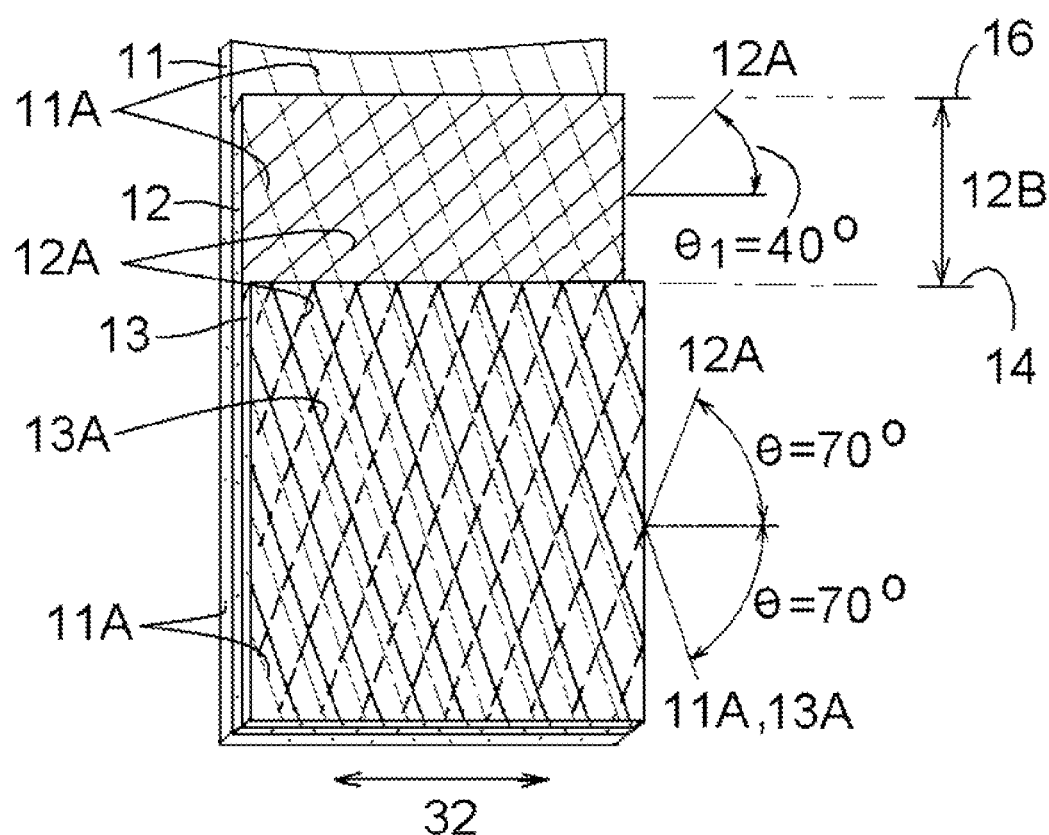

PNEUMATIC TIRE WITH SPECIFIED FIRST AND SECOND CARCASS PLIES

BACKGROUND OF THE INVENTION

Present invention relates to a pneumatic tire having a structure of a semi-radial tire. The invention also relates to a pneumatic tire suitable for achieving maneuverabilities at high speed, such as turning maneuverability, braking performance and straight-traveling performance. The invention relates, for example, to a tire for a four-wheel car such as racing car.

Semi-radial tires (bias belted tires) are occasionally used in order to achieve merits of both of radial and bias tires. Meanwhile, to cope with requirements of high maneuverability at high speed, investigated are improving of structures of the carcass and belt layers of pneumatic tire and arranging of a reinforcing layer.

According to a tire proposed in JP2008-024063A (Japan patent application publication No. 2008-024063), two carcass plies are overlaid with each other to form a carcass layer, in which each cord of one ply is inclined reversely to that of another ply, and a reinforcing layer is arranged on inner-face side of the tire. In this tire, one carcass ply, which is wound around a tire bead portion prior to the other, extends up to a position well within outer face of the tire bead portion; and the other carcass ply extends up to a middle height of a sidewall of the tire. Moreover, the reinforcing layer is arranged in a region starting from a position well within inner face of the tire bead portion and reaching shoulder portion of the tire. In other words, the reinforcing layer is arranged in a region for exhibiting flexibility of the tire. It is asserted, in JP2008-024063A, that such construction improves maneuvering stability.

According to a tire proposed in JP2007-290578A, in order to improve "traction and side-grip performances", arranged are two carcass plies and three reinforcing layers wound around the tire bead portion, JP2007-290578A also shows a tire, in which turned-up end of one carcass ply reaches a position inner than a fringe of the belt layer (FIG. 2, "ultra-high turned up construction").

According to a tire proposed in JP2011-000958A, in order to "enhance maneuverability of the tire without impairing comfortable ride"; "each cord of one carcass ply intersects that of another carcass ply to form a biased part and is inclined in opposite directions" between tire's side faces respectively coming to inner and outer sides of the of the vehicle, so as to form a symmetrical tire. JP2011-000958A also shows a tire, in which the carcass plies arranged "as omitted in a center region as separated to two regions as distant in tire-width direction".

BRIEF SUMMARY OF THE INVENTION

A pneumatic tire according to the invention comprises: first carcass ply that is comprised of a tire-inner-face part extending along inner face of the tire to span between the tire bead portions and turned-up parts extended as turned up from outer faces of the tire bead portions up to inside beyond fringes of a belt layer; and second carcass ply that is substantially omitted at between the tire bead portions and extends as being turned up from outer faces of the tire bead portions up to inside beyond fringes of a belt layer; and cords forming the tire-inner-face part, the turned-up part and the second carcass ply have inclination to radial direction of the tire, i.e., an orientation along inner face of the tire as perpendicular to tire circumferential direction, which is a direction in parallel with a center line of the tread; and direction of the inclination of the cords is alternated in respect of leftward or rightward, between two adjacent ones of the tire-inner-face part, the turned-up part and the second carcass ply.

BRIEF DESCRIPTION OF THE DRAWINGS

FIG. 1 is a sectional view in tire-width direction, showing a pneumatic tire of Example 4; and FIG. 2 is a schematic sectional and perspective view schematically showing a multi-layer structure of an essential part of a pneumatic tire of FIG. 1.

DETAILED DESCRIPTION OF THE INVENTION

In course of continuing investigation for further improving maneuverabilities at high speed, such as turning maneuverability, braking performance and straight-traveling performance, the inventor has come to realize that further improving of tire stiffness and further decreasing of tire weight are needed. Thus, it is aimed to provide a pneumatic tire that enables both of improving of tire stiffness and decreasing of tire weight so as to achieve high maneuverability.

In course of further investigation, the inventor has conceived that: omittable is the reinforcing layer in the sidewalls other than the carcass plies when to achieve sufficient tire stiffness. Based on this conception, following radial tire construction has been investigated: two carcass plies biased or inclined in opposite directions are overlapped with each other and their turned up parts biased in opposite directions are overlapped with each other; and each of the carcass plies extends inward beyond fringes of the belt layer region ("ultra-high turned up construction"). Namely, a very simple construction omitting the reinforcing layer other than the carcass plies is investigated so as to achieve a required stiffness. Moreover, in order to achieve further decreasing of weight of the tire, center region is omitted to only one of the carcass plies so that, such one carcass ply is omitted substantially in an entire region extending between the tire bead portions, or particularly in an entire region extending along inner face of the tire. As a result, unexpectedly achieved are: the decreasing of weight and required lateral stiffness as well as maneuvering stability based on such lateral stiffness.

According to the invention, a tire having both of high stiffness and light weight is obtained; and resultantly achieved are high maneuverabilities such as turning maneuverability, braking performance and straight-traveling performance.

In preferred embodiments, the turned-up part of the first carcass ply extends beyond a turned-up end of the second carcass ply, further inward in a tire-width direction, to form a jetty portion. More preferably, inclination of cords in the jetty portion is larger than that in other parts of the first carcass ply. In a preferred embodiment, the second carcass ply is arranged at outside of the first carcass ply. Nevertheless, in some occasions, the second carcass ply may be arranged at between the tire-inner-face part and the turned-up part of the first carcass ply.

According to a tire of the invention, turned-up ends of both of the first and second carcass plies are extended up to positions inner than the fringes of the belt layer, in tire-width direction. In this way, stiffness of the tire in lateral direction (tire-width direction) is improved; and stiffness of the tire is rendered to be uniform in buttress portions, each of which extends from upper end of the tire bead portion up to fringes of the tire. The buttress portions would be regions serving for exhibiting flexibility of the tire. Because stiffness is thus uniform in the regions for undertaking deformation of the tire, local concentration of deformation is avoided; and this is advantageous for achieving the maneuvering stability, riding comfort and durability.

In preferred embodiments, cords forming the first carcass ply and cords forming the second carcass ply are both designed to have inclination to the tire-circumferential direction, in a range of 60° to 85°. This range is advantageous in achieving of the stiffness by way of the semi-radial construction. The cords forming the plies are, for examples, formed of a polyester resin such as polyethylene terephthalate, or of a polyamide resin such as either of various Nylon resins.

In preferred embodiments, the first carcass ply in the tire is resulted by that: a sheet comprised of cords having substantially uniform inclination or bias is wound around the tire bead portion; and resultantly, inclination of the cords in a part extending along inner tire's inner face, or tire-inner-face part, is in an opposite side with respect to the tire's radial direction, vis-à-vis inclination of the cords in the turned-up part. Subsequently, at a time the second carcass ply is overlaid on outer face of the turned-up part of the first carcass ply, the cords of the second carcass ply are arranged to have inclination in an opposite side with respect to the tire's radial direction, vis-à-vis inclination of the cords in the turned-up part.

Hence, in a preferred embodiment, the cords in the tire-inner-face part of the first carcass ply are in parallel or substantially in parallel with the cords in the second carcass ply. Deviation of inclination of the cords between the tire-inner-face part and the second carcass ply is preferably not more than 10 degrees, and more preferably not more than 5 degrees. In this way, throughout whole of the buttress portions of the tire, the layers having the cords are overlapped as contacted with each other in a manner than the cords are arranged as crossing between the contacted layers. Thus, the lateral stiffness of the tire has been able to be improved to a maximum.

In preferred embodiments, turned-up end of the first carcass ply comes inner in tire-width direction, than turned-up end of the second carcass ply. Thus, in vicinity of the fringes of the belt layer, there is a band-shaped jetty portion of the turned-up part of the first carcass ply, which forms a two-layer lamination in absence of the second carcass ply, together with the tire-inner-face part of the first carcass ply. In a particularly preferred embodiments, inclination of the cords in the jetty portion of the turned-up part, with respect to the tire-radial direction, is larger than that in remaining of the turned-up part. Preferably, inclination of the cords in the remaining of the turned-up part is in a range of 60 to 85 degrees with respect to the tire-circumferential direction while inclination of the cords in the jetty portion in a range of 20 to 55 degrees, more preferably in a range of 30 to 50 degrees, with respect to the tire-circumferential direction. By such construction of the jetty portion, distribution of stiffness around fringes of the tire tread is able to be made as more uniform; and maneuverability is able to be further improved. In a preferred embodiment, deflection of the cords in the jetty portion, with respect to the cords in other part of the turned-up part of the first carcass ply, is in a range of 15 to 45 degrees, more preferably in a range of 20 to 40 degrees.

EXAMPLES

Examples of the invention are explained in following and are by no way construed to restrict the invention.

On first hand, in conjunction with FIGS. 1-2, it is explained a construction of a tire according to Example 4, which is shown in test results at far below. As shown in FIG. 1, carcass layer in the pneumatic tire 10 of the Example is formed of: a first carcass ply 1 and a second carcass ply 13; and no other reinforcing layer of cords is included in sidewalls of the tire. The first carcass ply is not omitted in center region and thus is formed of: a tire-inner-face part 11 that extends along inner face of the tire as to span between tire beads 25; and turned-up parts 12, each of which extends from the tire beads 25 to a side of the tire tread 33. In an illustrated example, each of the turned-up parts 12 is in direct contact with the tire-inner-face part 11 as the contact starting from a point that is slightly distanced from a tip of a bead filler 27 toward a tire shoulder 28. Meanwhile, a "turned-up end" 16, which means an end of the turned-up part 12 on inner side in tire-width direction, is distanced from a fringe 14 of the belt layer 2, by a predetermined distance D1, which is taken along any curvature of the plies in tire radial direction. In a tire for a four-wheel vehicle, the distance D1 is preferably in a range of 10 mm to 0.40 mm; and the turned-up end 16 is preferably distanced from equatorial plane of the tire by more than 50 mm.

The second carcass ply 13 has a center region omission, by which a whole part extending along the inner face of the tire is omitted. In an illustrated example, an end 15 of the second carcass ply 13, on a side of the tire bead 25, is positioned on an end of inner face of the tire. Namely, the second carcass ply 13 extends to surely cover whole of a part sandwiched between a bead core 26 of the tire bead 25 and a rim of a wheel. Meanwhile, the second carcass ply 13 extends up to a position in a vicinity of the fringe 24 of the belt layer 24. Namely, a "turned-up end" 14 of the second carcass ply 13 is positioned inner than the fringe 24, in the tire-width direction, as distanced from the fringe 24 preferably by a dimension in a range of 5 mm to 40 mm. Thus, a load bearing structure is formed by that: the turned-up part 12 of the first, carcass ply 1 and the second carcass ply 13 are surely spanned from the tire bead 25 to a fringe portion of the belt layer 2. In particular, only three layers for reinforcing are arranged in the tire sidewalls 29 so that a strong load bearing structure is formed by a minimum configuration. Meanwhile, in an illustrated example, the belt layer 2 is formed of two layers of belt plies 21 and 22; and a cap ply 23 covers outer face of the belt layer 2. Nevertheless, the fringe 24 of the belt layer is meant to be a fringe of the belt ply 21 that extends more outwardly than the other belt ply, in the tire-width direction, by neglecting the cap ply 23.

In this embodiment, the turned-up end 14 of the second carcass ply 13 is positioned between the fringe 24 of the belt layer 2 and the turned-up end 16 of the first carcass ply 1. In a prefer red embodiments of the tire for a four-wheel vehicle, a dimension D2 from the fringe 24 of the belt layer 2 to the turned-up end 14 of the second carcass ply 13 is in a range of 5 mm to 20 nm, which is taken along any curvature of the plies in tire radial direction; and a ratio to this dimension D2 of a dimension D1 from the fringe 14 of the belt layer 2 to the turned-up end 16 of the first carcass ply 1 is in a range of 1.5 to 2.3.

In following, explained is a laminate configuration of ply layers in a tire buttress portion; particularly explained is an example of concrete configuration in respect of orientations of the cords in the ply layers. In an illustrated example that matches Example 4 at far below, the cords 11A in the tire-inner-face part 11 are arranged in parallel with the cords 13A in the second carcass ply 13; and the cords 11A and 11B in both of these ply layers are inclined with respect to the tire-circumferential direction, by 70°. Meanwhile, in the turned-up part 12 sandwiched between the tire-inner-face part 11 and the second carcass ply 13, the cords 12A are inclined reversely to inclination of the cords 11A and 11B in the other ply layers, with respect to the tire-circumferential direction, by 70°. Consequently, the cords in one ply layer are arranged to cross the cords in next ply layer that is in direct contact with the one ply layer.

As shown in FIG. 2, the turned-up part 12 has a jetty portion 12B as protruded from the turned-up end 14 of the second carcass ply 13; and orientation of the cords 12A in the jetty portion 12B differs from that in remaining part of the turned-up part 12. Namely, orientation of the cords 12A is in a manner that the cords 12A are deflected by 30° on coming out from a part covered by the second carcass ply 13. As seen from FIG. 2, by such deflection, increased is a density of the cords in the tire-width direction, that is, number of the cords counted in a certain dimension in the tire-width direction. Hence, by such deflection, increased is reinforcing effect by the cords in a region having only two ply layers.

In following, explained are detailed tests and their results. A tire of Example 4 at below is the tire illustrated in FIGS. 1-2 and described at above. In Example 3 and Example 2, modification from Example 4 is made only in following: orientation of the cords 12A in the jetty portion 12B of the first carcass ply 1 is modified to 30° with respect to the tire-circumferential direction in Example 3; and is modified to 70° in Example 2 to have same orientation with the other ply layer. Meanwhile, in Example 1, modification from the Example 2 is made only in following: the position of the turned-up end 16 of the first carcass ply 1 and the position of the turned-up end 14 of the second carcass ply 13 are interchanged with each other.

In Example 5, modification from the Example 1 is made only in following: orientation of the cords is 40° with respect to the tire-circumferential direction, only in a 10-mm width end portion of the turned-up part 12, which begins at the fringe 24 of the belt layer 2 and ends at the turned-up end 16 of the first carcass ply 1.

In Comparative example 1, modification from the Example 1 is made only in following: orientation of the cords are in radial direction of the tire in both of the first, and second carcass plies 1 and 13; and the turned-up end 16 of the first carcass ply 1 is withdrawn beyond the fringe 24 of the belt layer 2 so as to be distanced by 20 mm from the fringe 24.

In Comparative example 2, modification from the Example 1 is made only in following: the turned-up end 16 is withdrawn beyond the fringe 24 of the belt layer 2 so as to foe distanced by 20 mm from front the fringe 24. In Comparative example 3, modification from the Comparative example 2 is made only in following: orientation of the cords in the second carcass ply 13 is same with that in the tire-inner-face part 11. In Comparative example 3, modification from the Example 1 is made only in following: orientation of the cords in the second carcass ply 13 is same with that in the tire-inner-face part 11.

Pneumatic tires dedicated to racing cars, which have a tire size of 245/640R18, were prepared according to either of the examples by forming a green tire having above-mentioned construction, on a tire forming drum, and then vulcanizing the green tire at 160° C. for 30 min.

<Tire stiffness> By use of a compression test machine, the tire was loaded with 110% and 90% of standard load that is 710 kg, to measure vertical strains of the tire; and then average of these strains is divided by the standard load to obtain a vertical stiffness. Meanwhile, the tire being subjected to the standard load in vertical direction was further subjected to lateral load that is 30% of the standard load to measure lateral strains of the tire; and then average of these strains is divided by the lateral load to obtain a lateral stiffness of the tire. The vertical and lateral stiffness's are expressed by indices assuming each value obtained for the Comparative example 1 as 100. The larger the index, the higher the stiffness.

<Maneuvering stability> The tires for testing are mounted on a vehicle; and turning, braking and straight-traveling are performed. Then, overall performances were evaluated with sensory evaluation by drivers. Evaluation results are expressed by indices assuming each value obtained for the Comparative example 1 as 100. The larger the index, the higher the maneuvering stability.

TABLE 1

|  | Com. Ex. 1 | Com. Ex. 2 | Com. Ex. 3 | Com. Ex. 4 | Ex. 1 | Ex. 2 | Ex. 3 | Ex. 4 | Ex. 5 |
| --- | --- | --- | --- | --- | --- | --- | --- | --- | --- |
| Tire-inner-face part 11 | | | | | | | | | |
| Inclined to right (R) or left (L) | — | R | R | R | R | R | R | R | R |
| Inclination angle (°) | 90 | 70 | 70 | 70 | 70 | 70 | 70 | 70 | 70 |
| Turned-up part 12 | | | | | | | | | |
| Inclined to right or left | — | L | L | L | L | L | L | L | L |
| Inclination angle (°)** | 90 | 70 | 70 | 70 | 70 | 70 | 70/50 | 70/40 | 70/40 |
| Turned-up end 16 (mm)* | 20 | 20 | 20 | −10 | −10 | −20 | −20 | −20 | −10 |
| Second ply 13 | | | | | | | | | |
| Inclined to right or left | — | L | R | L | R | R | R | R | R |
| Inclination angle (°) | 90 | 70 | 70 | 70 | 70 | 70 | 70 | 70 | 70 |
| Turned-up end 14 (mm)* | −20 | −20 | −20 | −20 | −20 | −10 | −10 | −10 | −20 |
| Tire stiffness | | | | | | | | | |
| Vertical | 100 | 110 | 112 | 111 | 113 | 113 | 114 | 115 | 113 |
| Lateral | 100 | 110 | 112 | 111 | 114 | 114 | 115 | 116 | 114 |
| Maneuvering stability | 100 | 102 | 103 | 103 | 104 | 105 | 106 | 106 | 105 |

*Position of the turned-up end is expressed as a distance (mm) from the fringe 24 of the belt layer 2, assuming as positive direction, a direction to a side of the tire bead as departing from the fringe. A minus value indicates a span within the belt layer as extending from the fringe toward center of the belt layer.
**"70/50" or "70/40" indicates that orientation of the cords in the jetty portion is 50° or 40°, respectively, while orientation of the cords in remaining part is 70°.

Performances of a tire of Comparative example 1, including the tire stiffnesses and the maneuvering stability, are almost equivalent to those of a typical and conventional tire for a racing car. Comparative example 2 is for a tire modified from Comparative example 1 as to have a radial tire arrangement and have orientation of the cords in the second carcass ply 13 same as that in the turned-up part 12. Resultantly, in Comparative example 2, although tire stiffnesses in vertical and lateral directions were considerably increased, improvement of the maneuvering stability was not remarkable as increases of the tire stiffnesses.

Comparative example 3 is for tire modified from Comparative example 2 as to make the cords in the second carcass ply 13 cross the cords in the turned-up part 1; and resultantly, tire stiffnesses in vertical and lateral directions were further improved and the maneuvering stability was slightly improved. Meanwhile, Comparative example 4 is for a tire modified from Comparative example 2 as to extend the turned-up end 16 up to fringe portion of the belt layer; and resultantly, obtained were performances almost in a same level as Comparative example 3.

In Example 1, the cords are crossed as in Comparative example 2 and the turned-up end 16 of the first carcass ply is extended to fringe portion of the belt layer; and resultantly, the tire stiffnesses were improved as compared with each of Comparative examples 2 and 3, and the maneuvering stability was further improved. Thus, the tire of Example 1 would be remarkably superior in performances, to the conventional and typical tire for a racing car.

In Example 2, the jetty portion 12B is provided on the turned-up part 12 as in FIG. 1 as modified from Example 1; and resultantly, the maneuvering stability was slightly improved whereas the tire stiffnesses were same, as compared with Example 1. In Examples 3 and 4, the cords in the jetty portions 12 are inclined with smaller angles with respect to the tire-circumferential direction than in the remaining pare as in FIG. 2; and resultantly, most excellent performances were obtained in respect of the tire stiffnesses and of the maneuvering stability. Almost no significant difference was found between Example 3, which has 50° of cord inclination in the jetty portion 12, and Example 4 that has 40° of the cord inclination. Nevertheless, Example 4 was considered to be slightly superior in the tire stiffnesses, to Example 3.

In Example 5, positions of the turned-up ends 14 and 16 are same as those in Example 1 and a region in vicinity of the turned-up end 16 of the turned-up part 12 is constructed as in Example 4; and resultantly, performances as same as Example 4 were obtained.

The invention is applicable to tires mounted on a racing car or other passenger vehicle.

REFERENCE NUMERALS

1 First carcass ply;
10 Pneumatic tire;
11 Tire-inner-face part of the first carcass ply;
11A, 12A, 13A cords of carcass plies;
12 Turned-up part of the first carcass ply;
12B Jetty portion;
13 Second carcass ply;
14 Turned-up end of the second carcass ply;
15 End of the second carcass ply on a side of tire bead;
16 Turned-up end of the first carcass ply;
2 Belt layer;
21 First belt ply;
22 Second belt ply;
23 Cap ply;
25 Tire bead;
26 Bead core;
27 Bead filler;
28 Tire shoulder;
29 Sidewall;
31 Equatorial plane of the tire;
32 Tire-circumferential direction;
33 Tire tread;
D1, D2 Distance from fringe of the belt layer.

What is claimed is:

1. A pneumatic tire comprising:
   a belt layer;
   two bead portions, each bead portion comprising a bead core having an axially inner face and an axially outer face;
   a first carcass parallel cord ply that is comprised of a tire-inner-face part extending along the inner face of the tire to span between the axially inner faces of the respective bead cores and turned-up parts extended as turned up from the axially outer faces of the respective bead cores up to inside beyond fringes of the belt layer; and
   a second carcass parallel cord ply that is omitted along the inner face of the tire at between the axially inner faces of the respective bead cores and extends as being turned up from the axially outer faces of the respective bead cores up to inside beyond fringes of the belt layer; and
   the parallel cords forming the tire-inner-face part, the turned-up parts and the second carcass ply having an inclination to the radial direction of the tire; and
   the direction of the inclination of the cords being alternated in respect of leftward or rightward, between two adjacent ones of the tire-inner-face part, the turned-up parts and the second carcass ply, wherein
   the first carcass ply has a jetty portion, which is further protruded from the turned-up end of the second carcass ply inward along the tire-width direction; in the tire-inner-face part, in the turned-up parts, and in the second carcass ply the inclination of the cords with respect to the tire-circumferential direction is a uniform inclination in a range of 60 to 85 degrees, and the cords in the tire-inner-face-part are in parallel within ±10 degrees with the cords in the second carcass ply; a distance of the axially innermost point of the respective turned-up part of the first carcass ply extended up to inside beyond fringes of the belt layer to the respective fringe of the belt layer is in a range of 10 mm to 40 mm, and a distance between the axially innermost point of the respective turned-up part and the equatorial plane of the tire is no less than 50 mm; and a ratio of a distance from the respective fringe of the belt layer to an axially innermost point of the respective turned-up part of the first carcass ply extended up to inside beyond fringes of the belt layer, with respect to that to an axially innermost point of the respective second carcass ply extended up to inside beyond fringes of the belt layer, is in a range of 1.5 to 2.5.

2. The pneumatic tire according to claim 1, wherein the second carcass ply is arranged on an outside of the first carcass ply, as seen from the tire bead portions.

3. The pneumatic tire according to claim 1, wherein all of the cords are formed of either a polyester resin or a polyamide resin.

* * * * *